United States Patent
Costigan et al.

(10) Patent No.: US 9,771,746 B2
(45) Date of Patent: Sep. 26, 2017

(54) WINDOW REGULATOR FOR A DOOR ASSEMBLY OF A VEHICLE

(71) Applicant: GM GLOBAL TECHNOLOGY OPERATIONS LLC, Detroit, MI (US)

(72) Inventors: Terrence P. Costigan, Fenton, MI (US); Priyank Kodandaram, Ann Arbor, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/813,267

(22) Filed: Jul. 30, 2015

(65) Prior Publication Data
US 2017/0030123 A1 Feb. 2, 2017

(51) Int. Cl.
*E05F 11/48* (2006.01)
*E05D 15/16* (2006.01)
*B60J 1/17* (2006.01)
*E05F 11/38* (2006.01)

(52) U.S. Cl.
CPC .............. *E05D 15/165* (2013.01); *B60J 1/17* (2013.01); *E05F 11/483* (2013.01); *E05F 11/485* (2013.01); *E05F 11/486* (2013.01); *E05F 11/385* (2013.01); *E05Y 2900/55* (2013.01)

(58) Field of Classification Search
CPC ......... E05D 15/165; B60J 1/17; E05F 11/483; E05F 11/485
USPC ........................................ 49/352, 349, 374
See application file for complete search history.

(56) References Cited

U.S. PATENT DOCUMENTS

| | | | | |
|---|---|---|---|---|
| 4,970,827 A * | 11/1990 | Djordjevic | ............ | E05F 11/488 49/349 |
| 5,263,282 A * | 11/1993 | Cooper | ................. | E05F 11/445 49/348 |
| 5,309,679 A * | 5/1994 | Ward | .................... | E05F 11/483 49/352 |
| 6,073,395 A * | 6/2000 | Fenelon | ................ | E05F 15/689 185/40 R |
| 6,631,586 B1 * | 10/2003 | Nakagomi | .............. | E05D 13/12 49/349 |
| 7,617,633 B2 * | 11/2009 | Shimura | ............... | E05F 11/382 49/348 |
| 7,905,057 B2 * | 3/2011 | Kirejczyk | ............ | E05F 11/483 49/352 |
| 8,196,638 B2 * | 6/2012 | Roberts | ..................... | E06B 9/54 160/194 |

(Continued)

*Primary Examiner* — Gregory J Strimbu
*Assistant Examiner* — Abe Massad
(74) *Attorney, Agent, or Firm* — Quinn IP Law

(57) ABSTRACT

A window regulator includes a guide and an elongated carrier attached to the guide. A drive cable is driven by an actuator to move the carrier relative to the guide. A support cable includes a first end that is attached to a forward edge of a window opening of a door structure. The support cable includes a second end that is attached to a lower end of the guide. A first direction control device is attached to and rotatably supported by the carrier, proximate to a forward edge of the window opening. A second direction control device is attached to and rotatably supported by the carrier, and is disposed rearward of the first direction control device, between the first direction control device and the guide. The support cable is engaged with and guided by the first direction control device and the second direction control device.

18 Claims, 3 Drawing Sheets

(56) References Cited

U.S. PATENT DOCUMENTS

2004/0144032 A1\* 7/2004 Smith .................. E05F 11/486
  49/352
2006/0059781 A1\* 3/2006 Berklich, Jr. ......... E05F 11/483
  49/352
2006/0059782 A1\* 3/2006 Garcia ................ B60R 16/0215
  49/358

\* cited by examiner

WINDOW REGULATOR FOR A DOOR ASSEMBLY OF A VEHICLE

TECHNICAL FIELD

The disclosure generally relates to a window regulator assembly for a door of a vehicle.

BACKGROUND

Vehicle door assemblies include a window regulator that is used to raise and lower a window. The window regulator is attached to and supported by a structure of the door assembly. The window regulator may include one or more guides, with each of the guides supporting a carrier to support the window. The carrier is moveable relative to its respective guide to raise and lower the window. The window regulator and the structure of the door must cooperate to prevent the window from rotating forward and/or rearward while being raised and/or lowered. Forward and/or rearward vertical edges of the window may move within and be supported by guide channels in the structure of the door assembly to prevent the window from rotating forward and/or rearward.

SUMMARY

A door assembly is provided. The door assembly includes a structure that defines a window opening, and a lower edge. A guide is attached to the structure. The guide extends between a first end and a second end along a guide axis. The first end of the guide is disposed adjacent the lower edge of the structure, and the second end of the guide is disposed adjacent the window opening. A carrier is attached to the guide. The carrier is moveable relative to the guide along the guide axis, between a raised position and a lowered position. The carrier is disposed adjacent the second end of the guide when in the raised position. A support cable includes a first end and a second end. The first end of the support cable is attached to the structure adjacent the window opening. The second end of the support cable is attached to the structure adjacent the lower edge of the structure, and is disposed either rearward or forward of the first end of the support cable along a longitudinal axis of the structure.

A window regulator assembly for a vehicle is also provided. The window regulator assembly includes a guide extending between a first end and a second end along a guide axis. A carrier is attached to the guide. The carrier is moveable relative to the guide along the guide axis, between a raised position and a lowered position. The carrier is disposed adjacent the second end of the guide when in the raised position. A drive cable interconnects an actuator, the carrier, and the guide. The drive cable is driven by the actuator to move the carrier relative to the guide between the raised position and the lowered position. A support cable includes a first end that is configured for attachment to a forward edge of a window opening of a door structure. The support cable includes a second end that is attached to the guide, proximate the first end of the guide. A first direction control device is attached to the carrier. The first direction control device is disposed proximate to the first edge of the carrier, with the support cable engaged with and guided by the first direction control device. A second direction control device is attached to the carrier. The second direction control device is disposed rearward of the first direction control device, between the first direction control device and the guide, with the support cable engaged with and guided by the second direction control device.

Accordingly, the support cable supports a forward edge of a window, to prevent the window from rotating relative to the guide toward the forward edge of the window opening, when the window is stationary, as well as when the window is raised and/or lowered. The window may be guided by a rearward guide channel in the structure of the door assembly to prevent rotation relative to the guide toward the rearward edge of the window opening. As such, the window regulator assembly prevents rotation of the window in a forward direction, while only using a single guide. Using only the single guide reduces the weight of the window regulator, and allows the structure of the door assembly to be configured in a manner that also reduces the weight of the door assembly.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a door assembly is generally shown at 20. The door assembly 20 includes a window regulator assembly 22 that is operable to raise and/or lower a window 24. While the window regulator assembly 22 is shown incorporated into a vehicular door assembly 20, it should be appreciated that the window regulator assembly 22 may be incorporated into some other structure 26 in order to raise and/or lower a window 24.

Figure 1:
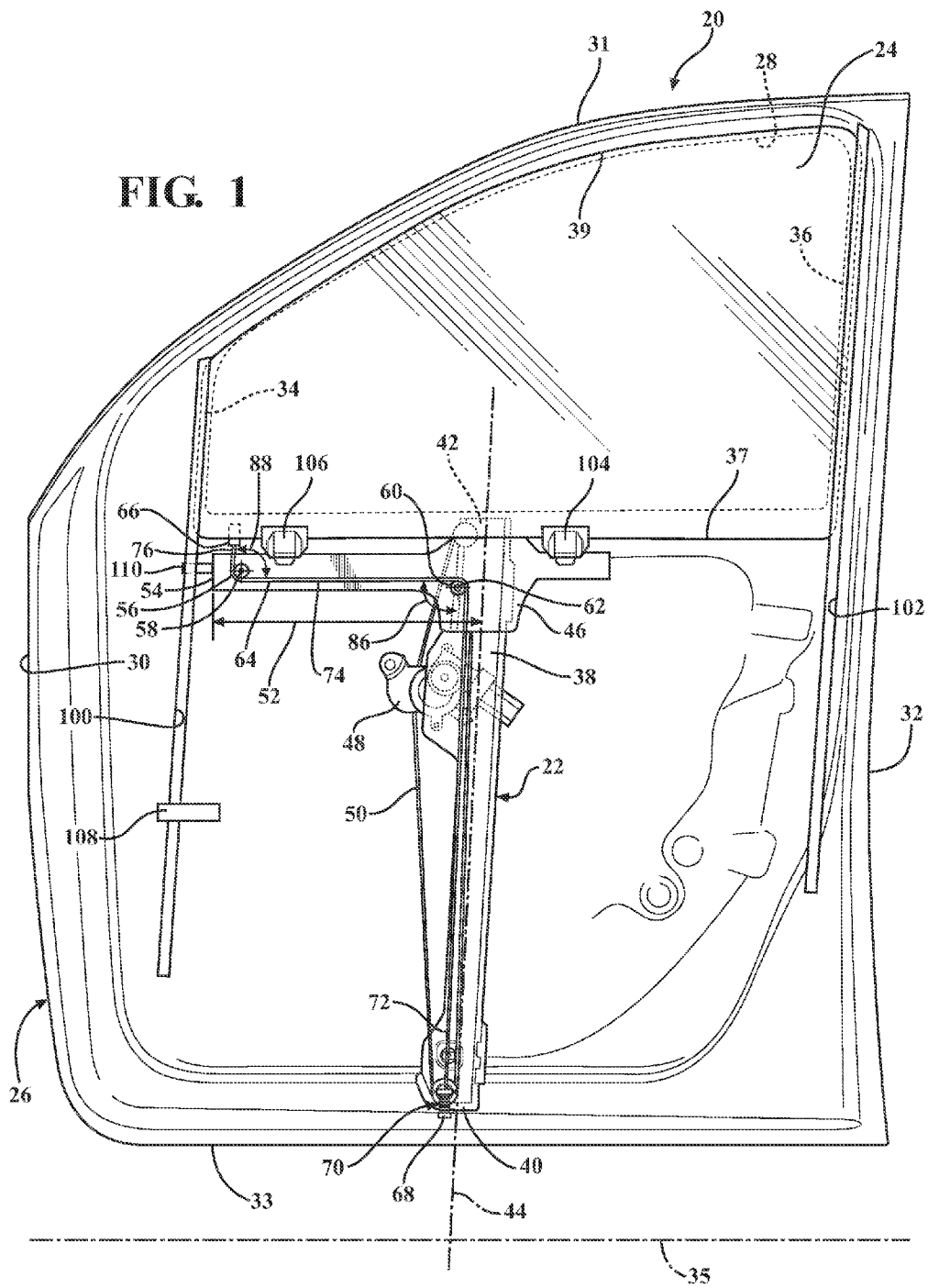
FIG. 1 is a schematic plan view of a door assembly, showing a window regulator assembly in a raised position.
Figure 2:
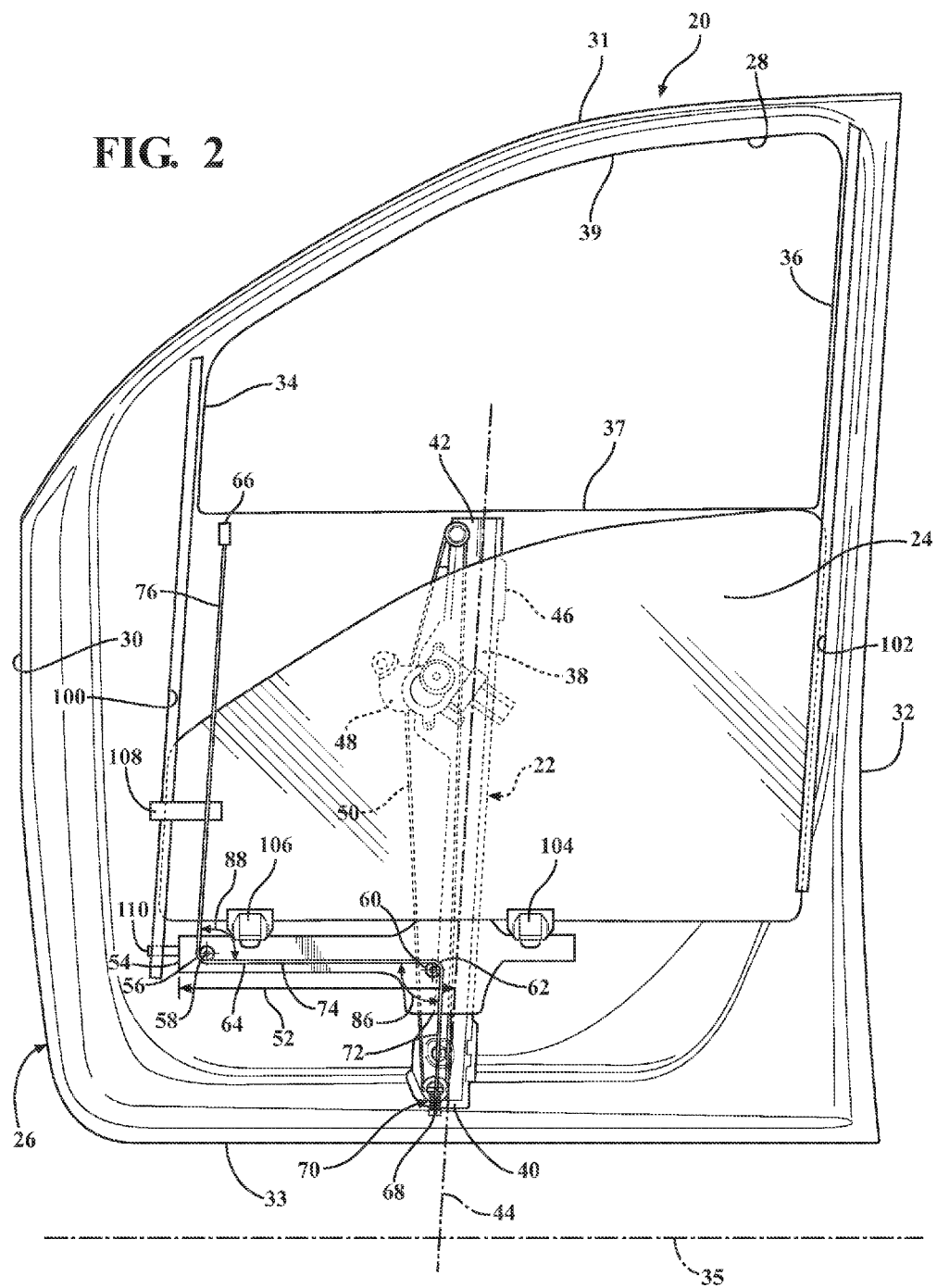
FIG. 2 is a schematic plan view of the door assembly, showing the window regulator assembly in a partially lowered position.

Referring to FIGS. 1 and 2, the door assembly 20 includes a structure 26. The structure 26 may be formed in any suitable manner from one or more components connected together. The structure 26 provides the framework necessary to support the various components of the door assembly 20, including but not limited to the window regulator assembly 22, the window 24, interior trim panels, control buttons/switches, etc. The structure 26 defines a window opening 28. As shown, the window opening 28 is disposed in the upper half of the door assembly 20 as viewed on the page. However, it should be appreciated that the window opening 28 may be positioned at some other location of the door assembly 20.

The structure 26 includes a first edge 30, a second edge 32, a third edge 31, and a fourth edge 33. The first edge 30 of the structure 26 is hereinafter referred to as the forward edge 30 of the structure 26. The second edge 32 of the structure 26 is hereinafter referred to as the rearward edge 32 of the structure 26. The third edge 31 of the structure 26 is hereinafter referred to as the upper edge 31 of the structure 26, and the fourth edge 33 of the structure 26 is hereinafter referred to as the lower edge 33 of the structure 26. Similarly, the window opening 28 includes a first edge 34, a second edge 36, a third edge 37, and a fourth edge 39. The first edge 34 of the window opening 28 is hereinafter referred to as the forward edge 34 of the window opening 28. The second edge 36 of the window opening 28 is hereinafter referred to as the rearward edge 36 of the window opening 28. The third edge 37 of the window opening 28 is hereinafter referred to as the lower edge 37 of the window opening 28. The fourth edge 39 of the window opening 28 is hereinafter referred to as the upper edge 39 of the window opening 28. As used herein, the term "forward" generally refers to a forward or front end of a vehicle to which the door assembly 20 is to be attached, and the term "rearward" generally refers to a rearward or rear end of the vehicle to which the door assembly 20 is to be attached, as viewed along a longitudinal axis 35. Accordingly, as viewed on the page of the Figures, the forward end of the longitudinal axis 35 is shown at the left of the respective Figures, and the rearward end of the longitudinal axis 35 is shown at the right of the respective Figures. It should be appreciated that the terms "forward" and "rearward" are used merely as descriptors to define relative positions of different features of the door assembly 20. Similarly, as used herein, the term "upper" generally refers to a vertically higher elevation relative to the term "lower". Accordingly, as viewed on the page of the Figures, the upper edge is shown at the top of the respective Figures, and the lower edge is shown at the bottom of the respective Figures. It should be appreciated that the terms "upper" and "lower" are used merely as descriptors to define relative positions of different features of the door assembly 20.

The structure includes a first window channel 100, and a second window channel 102. The first window channel 100 is disposed adjacent, and generally parallel with the forward edge 30 of the structure 26. The second window channel 102 is disposed adjacent, and generally parallel with the rearward edge 32 of the structure 26. The first window channel 100 and the second window channel 102 slideable support and guide a forward edge of the window 24 and a rearward edge of the window 24 respectively, as is known in the art.

The window regulator assembly 22 includes a guide 38 that is attached to the structure 26. Preferably, the guide 38 is manufactured from a polymer material, such as a plastic. However, the guide 38 may be manufactured from any suitable material, such as a metal or other similar material. As shown in the Figures, the guide 38 extends generally vertically as viewed on the page of the Figures, between a lower or first end 40 of the guide 38, and an upper or second end 42 of the guide 38. The guide 38 extends between the first end 40 and the second end 42 along a central axis of the guide 38, hereinafter referred to as the guide axis 44. The guide axis 44 is generally parallel with the first window channel 100 and the second window channel 102. The first end 40 of the guide 38 is disposed adjacent the lower edge 33 of the structure 26. The second end 42 of the guide 38 is disposed adjacent the lower edge 37 of the window opening 28. While the guide 38 and the guide axis 44 are shown in the exemplary embodiment as being generally vertical, it should be appreciated that the guide 38 and the guide axis 44 may be positioned at any orientation suitable for the specific use and/or operation of the window regulator assembly 22. The guide 38 is fixedly attached to the structure 26, and is positionally fixed relative to the structure 26. The guide 38 may be attached to the structure 26 in any suitable manner. For example, the guide 38 may be attached to the structure 26 with a series of mechanical fasteners, such as bolts or screws. However, the guide 38 may be attached to the structure 26 in some other manner not described herein.

A carrier 46 is slideably attached to the guide 38. The carrier 46 is moveable relative to the guide 38 along the guide axis 44, between a raised position and a lowered position. For example, the carrier 46 may slide within grooves of the guide 38. The carrier 46 supports the window 24, with the window 24 being attached to the carrier 46. As shown in FIG. 1, the carrier 46 is disposed adjacent the upper or second end 42 of the guide 38 when the carrier 46 is disposed in the raised position. The carrier 46 and the window 24 move toward the lower or first end 40 of the guide 38 as the carrier 46 moves from the raised position into the lowered position, such as shown in FIG. 2.

The window 24 may be attached to and supported by the carrier 46 in any suitable manner. For example, the carrier 46 may include a connector 104 for attaching the window 24 to the carrier 46. The connector 104 may include a "snap-in" connector, in which the window 24 snaps into and is secured relative to the carrier 46. Alternatively, the connector 104 may include a "clamp" connector, in which the window 24 is clamped in place relative to the carrier 46, as is known in the art. In addition to the connector 104, the carrier 46 further includes a window support 106. The window support 106 supports a portion of the weight of the window 24, relative to the carrier 46, but does not fixedly attach the window 24 to the carrier 46.

The window regulator assembly 22 further includes an actuator 48 and a drive cable 50 that operate as known to those skilled in the art to move the carrier 46 between the raised position and the lowered position. The actuator 48 may be coupled to the structure 26 of the door assembly 20. The actuator 48 may include, but is not limited to, an electric motor or other device capable of linearly moving the drive cable 50. The drive cable 50 interconnects the actuator 48, the carrier 46, and the guide 38. The drive cable 50 is driven by the actuator 48 in a reversible, endless loop, to move the carrier 46 relative to the guide 38. As such, the actuator 48 drives the drive cable 50 in a first direction to raise the carrier 46 and the window 24, and drives the drive cable 50 in an opposite or second direction to lower the carrier 46 and the window 24.

As shown in the exemplary embodiment of the Figures, the guide 38 is disposed at an approximate mid-section of the window opening 28 and/or the window 24, approximately halfway between the forward edge 34 of the window opening 28 and the rearward edge 36 of the window opening 28. The carrier 46 extends substantially from the guide 38 to the forward edge 34 of the window opening 28. The carrier 46 extends from the guide 38 a length 52 to a distal end 54. The length 52 of the carrier 46 is configured to position the distal end 54 of the carrier 46 adjacent the forward edge 34 of the window opening 28 and the first window channel 100. Accordingly, the carrier 46 generally spans across the forward half of the window opening 28. As such, the carrier 46 includes a forward edge disposed approximately adjacent the forward edge 34 of the window opening 28, and a rearward edge disposed approximately adjacent the guide 38. The carrier 46 may include a finger 110, disposed at the distal end 54 of the carrier 46, configured for engaging or contacting the first window channel 100. The finger 110 may assist in aligning the carrier 46 with the first window channel 100, during installation of the window 24, by limiting movement of the carrier 46 in a direction into or out of the page as shown in the Figures.

The carrier 46 includes a first direction control device 56 disposed proximate to the forward edge 34 of the window opening 28. The first direction control device 56 is attached to the carrier 46. The first direction control device 56 is disposed proximate to the forward edge, i.e., the distal end 54, of the carrier 46. In one embodiment, the first direction control device 56 includes a pulley that is rotatably mounted to the carrier 46, and is rotatable about a first axis 58, relative to the carrier 46. The first axis 58 is generally perpendicular to and laterally offset from the guide axis 44. The first direction control device 56 may include any suitable type and/or style of pulley capable of guiding and/or redirecting a path of a cable. Alternatively, the first direction control device 56 may include a non-rotatable device that is attached to the carrier 46, and is capable of re-directing a cable, such as but not limited to a post, peg, or other similar device, about which a cable may be bent and re-directed.

The carrier 46 includes a second direction control device 60 disposed rearward of the first direction control device 56, closer to the rearward edge 36 of the window opening 28 than the first direction control device 56. In the exemplary embodiment shown in the Figures, the second direction control device 60 is disposed between the first direction control device 56 and the guide 38, i.e., forward of the guide 38 and rearward of the first direction control device 56. However, it is contemplated that the second direction control device 60 may be disposed rearward of the guide 38. The second direction control device 60 is attached to the carrier 46. In one embodiment, the second direction control device 60 includes a pulley that is rotatably mounted to the carrier 46, and is rotatable about a second axis 62, relative to the carrier 46. The second axis 62 is generally perpendicular to and laterally offset from the guide axis 44. In the exemplary embodiment shown in the Figures, the first axis 58 of the first direction control device 56 is laterally offset from the guide axis 44 farther than is the second axis 62 of the second direction control device 60. The second direction control device 60 may include any suitable type and/or style of pulley capable of guiding and/or redirecting a path of a cable. Alternatively, the second direction control device 60 may include a non-rotatable device that is attached to the carrier 46, and is capable of re-directing a cable, such as but not limited to an annular slider, peg, or other similar device, about which a cable may be bent and re-directed.

The window regulator assembly 22 further includes a support cable 64. The support cable 64 includes a first end 66 and a second end 68. The first end 66 of the support cable 64 is attached to the structure 26, adjacent or proximate to the window opening 28. In the exemplary embodiment shown in the Figures, the first end 66 of the support cable 64 is attached to the structure 26 adjacent the forward edge 34 of the window opening 28. However, alternative embodiments may include the first end 66 of the support cable 64 attached to the structure 26 adjacent the rearward edge 36 of the window opening 28. The first end 66 of the support cable 64 may be attached to the structure 26 in any suitable manner, such as but not limited to a threaded fastener extending through an eyelet or opening attached to the first end 66 of the support cable 64 and into threaded engagement with the structure 26. Alternatively, the first end 66 of the support cable 64 may be attached to the structure 26 by extending a bulbous end through a large portion of a keyhole slot, and then sliding the bulbous end into a narrower, locking section of the keyhole slot, to secure the first end 66 of the support cable 64 relative to the structure 26.

The second end 68 of the support cable 64 is attached to the structure 26 adjacent or proximate to the lower edge 33 of the structure, and is disposed either rearward or forward of the first end 66 of the support able 64 along the longitudinal axis 35. As shown in the exemplary embodiment of the Figures, the second end 68 of the support cable 64 is attached to the structure 26 adjacent the lower or first end 40 of the guide 38. However, it should be appreciated that the second end 68 of the support cable 64 may be attached to the structure 26 either rearward of or forward of the guide 38, along the longitudinal axis 35. The second end 68 of the support cable 64 may be attached to the structure 26 directly, or indirectly attached to the structure 26 via the guide 38. In other words, the second end 68 of the support cable 64 may be directly attached to the first end 40 of the guide 38, with the guide 38 connecting the support cable 64 to the structure 26. The second end 68 of the support cable 64 may be attached to the structure 26 in any suitable manner, such as but not limited to a threaded fastener extending through an eyelet or opening attached to the second end 68 of the support cable 64 and into threaded engagement with the structure 26. Alternatively, the second end 68 of the support cable 64 may be attached to the structure 26 by extending a bulbous end through a large portion of a keyhole slot, and then sliding the bulbous end into a narrower, locking section of the keyhole slot, to secure the second end 68 of the support cable 64 relative to the structure 26. Furthermore, one of the first end 66 or the second end 68 of the support cable 64 may be attached or connected to the structure 26 with a biasing mechanism 70 described in greater detail below.

The support cable 64 is engaged with and guided by the first direction control device 56 and the second direction control device 60 respectively. The support cable 64 may include any type of cable capable of providing sufficient tension to the carrier 46 to prevent significant rotation of the window 24 and the carrier 46. For example, the support cable 64 may include a steel cable, or some other rigid, cable-like material.

The support cable 64 includes a first segment 72 that extends between the second end 68 of the support cable 64 and the second direction control device 60, in a direction substantially parallel with the guide axis 44, and parallel with the first window channel 100 and the second window channel 102. The support cable 64 includes a second segment 74 that extends between the second direction control device 60 and the first direction control device 56, in a direction substantially transverse to the guide axis 44, and parallel to a belt line at the lower edge 39 of the window opening 28. The support cable 64 passes around rearward and upper edges of the second direction control device 60 as viewed on the page of the Figures, to transition between the first segment 72 and the second segment 74. The support cable 64 includes a third segment 76 that extends between the first direction control device 56 and the first end 66 of the support cable 64, in a direction substantially parallel with the guide axis 44, and parallel with the first window channel 100 and the second window channel 102. The support cable 64 passes around lower and forward edges of the first direction control device 56 as viewed on the page of the Figures, as the support cable 64 transitions between the second segment 74 and the third segment 76.

Figure 3:
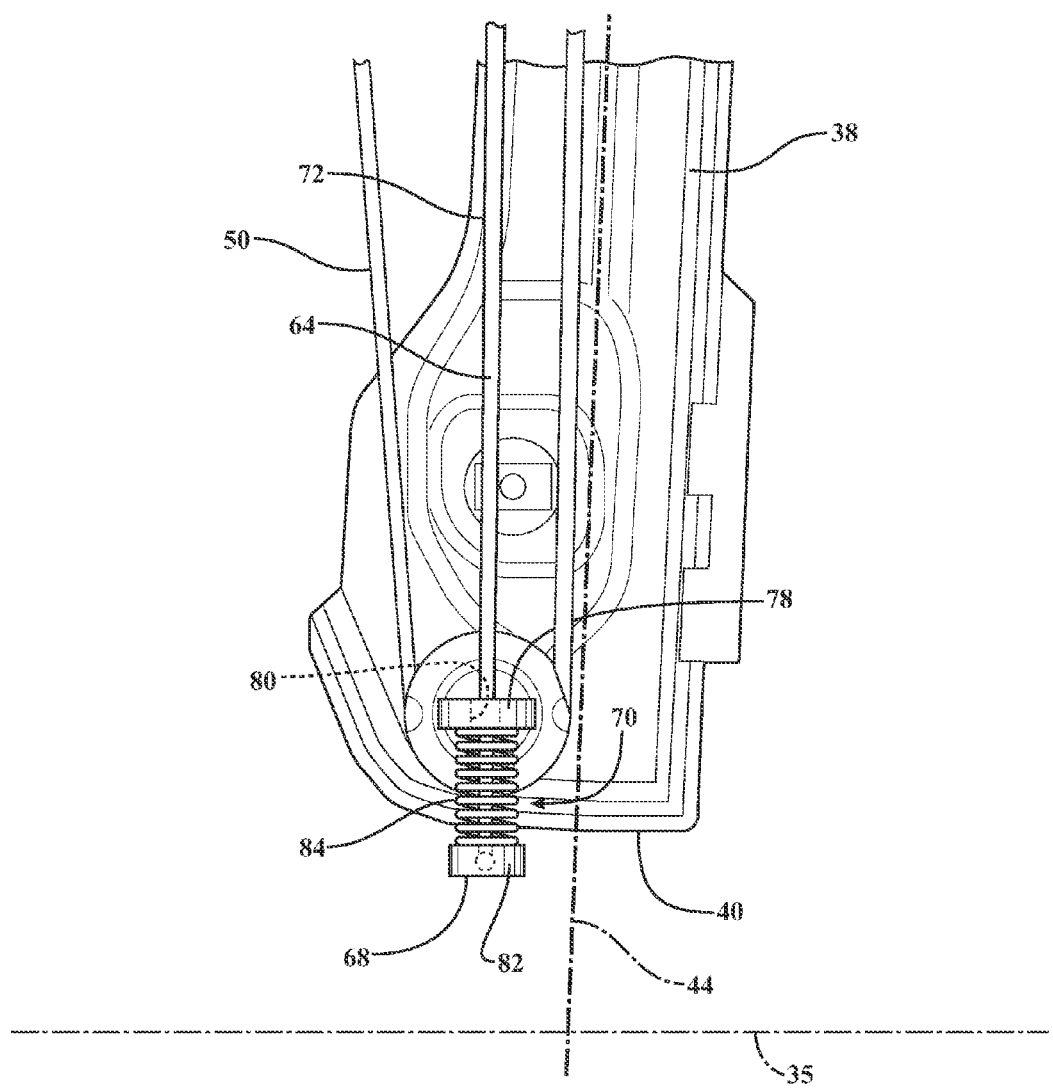
FIG. 3 is a schematic plan view of a biasing mechanism of the window regulator assembly.

The support cable 64 may include the biasing mechanism 70 as noted above. The biasing mechanism 70 is operable to tension the support cable 64, i.e., provide a tensioning force to the support cable 64. The biasing mechanism 70 may be configured in any suitable manner capable of tensioning the support cable 64, between the first end 66 and the second end 68 of the support cable 64. Referring to FIG. 3, the biasing mechanism 70 may include a flange 78 fixedly attached to and extending outward from the guide 38 or the structure 26. The flange 78 defines an aperture 80, through which the support cable 64 extends. The second end 68 of the support cable 64 includes an end fitting 82. A coil spring 84 or other similar device is disposed between the flange 78 and the end fitting 82. The coil spring 84 is pre-compressed to provide an expansive force, which biases against the fixed flange 78 and the end fitting 82, thereby introducing tension into the support cable 64. While the biasing mechanism 70 is shown in the exemplary embodiment described herein as being attached to the second end 68 of the support cable 64, it should be appreciated that the biasing mechanism 70 could alternatively be attached to the first end 66 of the support cable 64, or may be disposed at some location between the first end 66 and the second end 68 of the support cable 64.

The first segment 72 and the second segment 74 of the support cable 64 define a first interior angle 86 therebetween. Similarly, the second segment 74 and the third segment 76 of the support cable 64 define a second interior angle 88 therebetween. The first interior angle 86 and the second interior angle 88 remain substantially constant as the carrier 46 and the window 24 move between the raised position and the lowered position, to maintain the relative position and/or orientation of the first segment 72, the second segment 74, and the third segment 76 of the support cable 64 relative to the guide axis 44.

In operation, a rearward edge of the window 24 moves within the second window channel 102 of the structure 26, at the rearward edge 36 of the window opening 28. Accordingly, rotation of the window 24 relative to the carrier 46 in a rearward direction is resisted by the second window channel 102 of the structure 26 at the rearward edge 36 of the window opening 28. The orientation of the support cable 64 relative to the carrier 46, i.e., the engagement between the support cable 64 and the first direction control device 56 provides an upward force to the forward edge of the carrier 46, adjacent the forward edge 34 of the window 24, to resist rotation of the carrier 46 and/or the window 24 relative to the guide 38 in a forward direction. As the carrier 46 moves between the raised position and the lowered position, the relative lengths of the first segment 72 and the third segment 76 of the support cable 64 will change in equal and opposite values. However, the relative orientation of the first segment 72, the second segment 74, and the third segment 76 of the support cable 64, relative to the guide axis 44, remains constant, thereby maintaining a constant tension in the support cable 64. As such, the first interior angle 86 and the second interior angle 88 remain constant as the carrier 46 is raised or lowered.

The first window channel 100 may include a guide feature 108. Due to curvature of the structure 26 into and out of the page of the Figures, a gap distance between the support cable 64 and the first window channel 100 may change as the carrier 46 is raised and/or lowered, changing the amount of lift or resistance provided by the support cable 64. The guide feature 108 maintains a separation or gap distance, into or out of the page of the Figures, between the support cable 64 and the first window channel 100, as the carrier 46 is raised and/or lowered, in order to maintain a consistent amount of lift or resistance in the support cable 64.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A door assembly comprising:
   a structure having a first edge, a second edge, and a lower edge, and wherein the structure defines a window opening having a first edge, with the first edge of the window opening disposed adjacent to the first edge of the structure;
   a guide attached to the structure generally midway between the first edge and the second edge of the structure, wherein the guide extends between a first end and a second end of the guide along a central axis of the guide;
   wherein the first end of the guide is disposed adjacent the lower edge of the structure generally midway between the first edge and the second edge of the structure, and the second end of the guide is disposed adjacent the window opening generally midway between the first edge and the second edge of the structure;
   a carrier attached to the guide and moveable relative to the guide along the central axis of the guide between a raised position and a lowered position, wherein the carrier is disposed adjacent the second end of the guide when in the raised position;
   wherein the carrier includes a first direction control device disposed proximate to the first edge of the window opening;
   wherein the carrier includes a second direction control device disposed between the first direction control device and the central axis of the guide;
   a drive cable operable to move the carrier; and
   a support cable engaged with and guided by the first direction control device and the second direction control device, the support cable having a first end attached to the structure adjacent the window opening, and a second end attached to the structure adjacent the first end of the guide and the lower edge of the structure, wherein the support cable is disposed entirely between the central axis of the guide and the first edge of the structure.

2. The door assembly set forth in claim 1 wherein the window opening includes a second edge, and wherein the first end of the cable is attached to the structure proximate the first edge of the window opening.

3. The door assembly set forth in claim 2 wherein the second direction control device is disposed closer to the second edge of the window opening than the first direction control device.

4. The door assembly set forth in claim 3 wherein the support cable extends between the second end of the support cable and the second direction control device in a direction substantially parallel with the central axis of the guide.

5. The door assembly set forth in claim 4 wherein the support cable extends between the second direction control device and the first direction control device in a direction substantially transverse to the central axis of the guide.

6. The door assembly set forth in claim 5 wherein the support cable extends between the first direction control device and the first end of the support cable in a direction substantially parallel with the central axis of the guide.

7. The door assembly set forth in claim 1 wherein the carrier extends substantially from the guide to the first edge of the window opening.

8. The door assembly set forth in claim 1 wherein the support cable includes a biasing mechanism tensioning the support cable.

9. The door assembly set forth in claim 8 wherein the biasing mechanism includes a spring.

10. The door assembly set forth in claim 8 wherein the biasing mechanism interconnects the structure and one of the first end of the support cable or the second end of the support cable.

11. The door assembly set forth in claim 1 further comprising:
   an actuator coupled to the structure;
   the drive cable interconnecting the actuator, the carrier, and the guide; and
   wherein the drive cable is driven by the actuator to move the carrier relative to the guide between the raised position and the lowered position.

12. A window regulator assembly for a vehicle, the window regulator assembly comprising:
   a guide extending between a first end and a second end of the guide along a central axis of the guide, the guide configured to be attached to a door structure of the vehicle generally midway between a first edge and a second edge of the door structure;
   a carrier attached to the guide and moveable relative to the guide along the central axis of the guide between a raised position and a lowered position, wherein the carrier is disposed adjacent the second end of the guide when in the raised position;
   an actuator and a drive cable, wherein the drive cable interconnects the actuator, the carrier, and the guide, and wherein the drive cable is driven by the actuator to move the carrier relative to the guide between the raised position and the lowered position;
   a support cable having a first end configured for attachment to a first edge of a window opening of the door structure, and a second end configured for attachment to the guide proximate the first end of the guide, wherein the support cable is disposed entirely between the central axis of the guide and the first edge of the structure;
   a first direction control device attached to the carrier, wherein the first direction control device is disposed proximate to a first edge of the carrier, with the support cable engaged with and guided by the first direction control device; and
   a second direction control device attached to the carrier, wherein the second direction control device is disposed between the first direction control device and the central axis of the guide, with the support cable engaged with and guided by the second direction control device.

13. The window regulator assembly set forth in claim 12 wherein the support cable extends between the second end of the support cable and the second direction control device in a direction substantially parallel with the central axis of the guide.

14. The window regulator assembly set forth in claim 13 wherein the support cable extends between the second direction control device and the first direction control device in a direction substantially transverse to the central axis of the guide.

15. The window regulator assembly set forth in claim 14 wherein the support cable extends between the first direction control device and the first end of the support cable in a direction substantially parallel with the central axis of the guide.

16. The window regulator assembly set forth in claim 12 wherein the carrier extends from the guide a length to a distal end of the carrier, wherein the length of the carrier is configured to position the distal end of the carrier adjacent the first edge of the window opening.

17. The window regulator assembly set forth in claim 12 wherein the support cable includes a biasing mechanism operable to tension the support cable.

18. The window regulator assembly set forth in claim 12 characterized by including not more than the one guide slideably supporting the carrier.

* * * * *